Nov. 15, 1960     R. G. CUMINGS     2,960,656
UNIPULSE GATE
Filed June 30, 1959
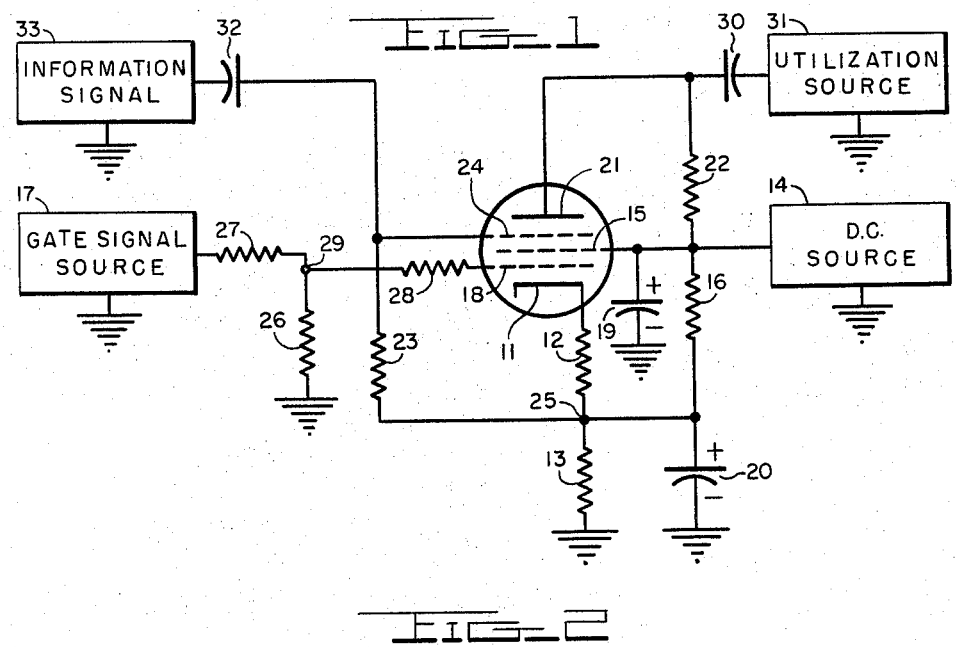
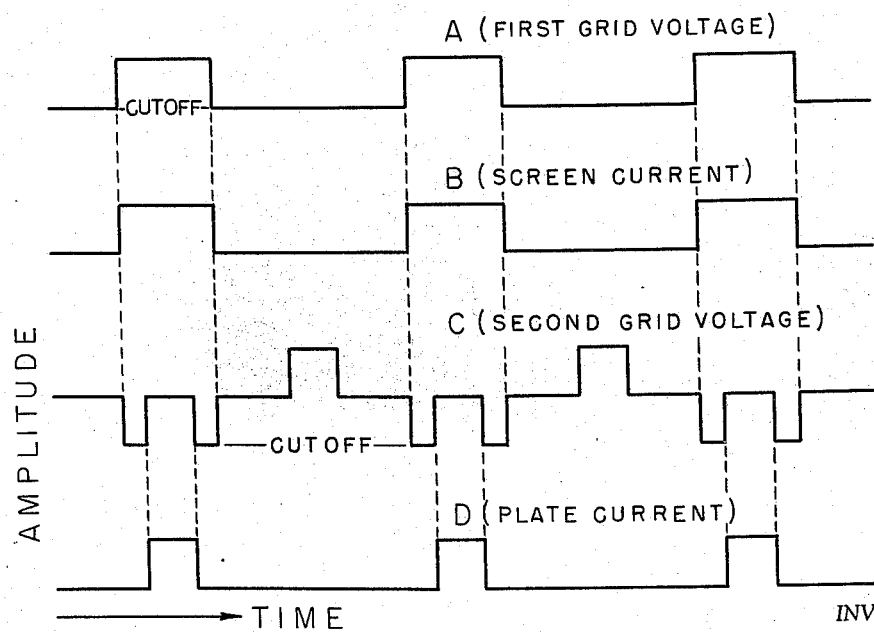
INVENTOR
RICHARD G. CUMINGS
BY *Richard C. Reed*
ATTORNEY

2,960,656
UNIPULSE GATE

Richard G. Cumings, 2716 Ramblewood Drive,
District Heights, Md.

Filed June 30, 1959, Ser. No. 824,163

3 Claims. (Cl. 328—102)

(Granted under Title 35, U.S. Code (1952), sec. 266)

The invention described herein may be manufactured and used by or for the Government of the United States of America for governmental purposes without the payment of any royalties thereon or therefor.

The present invention relates to gating circuits and is particularly concerned with a gating circuit wherein certain portions of an information signal applied thereto are selectively passed without distortion.

When an information signal as, for example, a specific pulsed waveform is to be selectively passed from one circuit to another, an intervening gate or switch is generally used which is opened by a synchronized gating pulse. When the gate is a vacuum tube triode or similar device the gating pulse conventionally alters the cathods, grid or plate electrode voltage of the tube so that application of the information pulse to one of these electrodes will cause a large plate current to flow.

Unfortunately, variations in the applied voltages or the emission characteristics of the tube are generally such that the gating pulse above is sufficient to cause some current to flow. The output pulse is, therefore, a combination of the gating on information pulses. When subsequent circuits are to be driven according to the width, slope, etc., of the waveform this condition can be highly detrimental to proper operation.

An object of the present invention is, therefore, to provide a novel gating circuit in which the output signal is solely a function of the input information signal, and is unaltered by the gating signal.

A further object of the invention is to provide a novel gating circuit using a pentode vacuum tube interconnected to isolate the gated output from the gating signal input.

These and other objects of the invention will be better understood with reference to the accompanying drawings wherein:

Figure 1 is a circuit diagram of the invention; and

Figure 2 is a graph of the current and voltages which appear at the electrodes of the pentode in Figure 1 with specific input signals.

Referring to Figure 1 there is shown a pentode gate circuit of the invention. The cathode 11 of the pentode is indirectly heated by a filament, not shown, and is connected to ground through a first cathode resistor 12 and a second cathode resistor 13. To induce the flow of cathode current a positive D.C. source 14 is connected to the screen grid 15. A dropping resistor 16 is connected between the D.C. source and the ungrounded end of the second cathode resistor. The dropping resistor and the second cathode resistor form a voltage divider by means of which a fixed bias voltage is applied to the cathode. The first and second cathode resistors supply a certain amount of self bias when current flows in the cathode screen circuit. However, this voltage is negligible compared to the fixed bias voltage, which is sufficient to cut off the screen current.

The gating signal source 17 supplies positive pulses or other suitable waveforms to the first control grid 18 which initiates the flow of cathode-screen current. A filter capacitor 19 is shunted across the D.C. source to absorb the resultant current pulses, thereby stabilizing the screen voltage. A similar capacitor 20 across the second cathode resistor 13 stabilizes the fixed bias voltage.

Plate current is initiated by connecting the plate 21 through a plate resistor 22 to the D.C. source. Plate current, of course, will flow only when there is screen current. By connecting the normally grounded end of the grid leak resistor 23 of the second control grid 24 to the centertap 25 of the voltage divider comprising the first and second cathode resistors, the self bias voltage, which becomes quite large as the screen current approaches its maximum value, serves to maintain the plate current at cutoff after the gating pulse is applied to the first control grid.

The inputs to the control grids are relatively insensitive to frequency. The first control grid is fed from a D.C. coupling network which comprises a voltage divider including series resistors 26 and 27 matching the output impedance of the gate signal generator and a grid current limiting resistor 28 connecting the centertap 29 of the voltage divider to the control grid. The second control grid is fed through a capacitor 32 having a sufficiently large value to pass the highest frequency component of the input information signal. The grid leak resistor 23 has a value small enough to prevent accumulation of grid leak bias on capacitor 32.

The gated output is removed through a coupling capacitor 30 connected between the plate 21 and the ungrounded terminal of utilization device 31. Here again the value of the capacitor 30 is large enough to pass the output waveform with negligible distortion. Typical values of the components used in Figure 1 may be as follows:

Screen voltage _____ 250 v.
Resistors:
   27 _____kilohm__ 680
   26 _____do____ 270
   28 _____do____ 100
   23 _____do____ 100
   12 _____ohm__ 4700
   13 _____do____ 3000
   22 _____do____ 6800
   16 _____kilohm__ 18
Capacitors:
   32 _____mfd__ 0.22
   30 _____mfd__ 1.0

Figure 2 shows the voltage and current waveforms of the circuit with a continuous square wave input gated at half the input frequency. Waveform A is the gating waveform as applied to the first control grid. Waveform B shows the resultant screen which has essentially the same waveform as the gating signal. Curve C shows the waveform applied to the second control grid. This signal is a composite of the continuous pulsed input waveform and bias signal obtained from the cathode circuit. Curve D shows the current waveform in the plate circuit. There is no appreciable current in the plate circuit, except where the curves B and C indicate values substantially greater than the minimum the screen current and second grid voltage occurring simultaneously.

Obviously many modifications and variations of the present invention are possible in the light of the above teachings. It is therefore to be understood that within the scope of the appended claims the invention may be practiced otherwise than as specifically described.

What is claimed is:

1. A unipulse gate comprising; a vacuum tube including at least a plate, a cathode, a center screen grid, a first control grid between said screen grid and said cathode, and a second control grid between said screen grid and said plate; a grounded positive D.C. potential source connected to said screen grid and said plate; a constant bias means connected to said cathode and said source for applying a potential to said cathode which is a minor fraction of the potential of said source; and self bias means connected between said second grid and said cathode for applying a potential to said second control grid less than the potential of said cathode by a factor directly proportional to the screen current.

2. A unipulse gate comprising; a vacuum tube including at least a plate, a cathode, a center screen grid, a first control grid between said screen grid and said cathode, and a second control grid between said screen grid and said plate; a D.C. potential source including a grounded terminal and a positive terminal connected to said screen grid and said plate; a first voltage divider connected across said source; said first divider having a low voltage tap; a second voltage divider connected between said cathode and the grounded terminal of said source; said second divider including the portion of said first divider between said low voltage tap and ground.

3. A unipulse gate comprising; a pentode vacuum tube including a plate, a cathode, a screen grid between said cathode and plate, a control grid between said screen grid and said cathode, and a suppressor grid between said screen grid and said plate; a grounded source of positive potential connected directly to said screen grid, first and second serially connected bias resistors having a common terminal shunted between said screen grid and a grounded portion of said source, a third bias resistor interconnecting said common terminal to said cathode, a fourth bias resistor interconnecting said common terminal and said suppressor grid, an electrolytic capacitor with a positive terminal connected to said common terminal and a grounded negative terminal, a load resistor interconnecting said plate and said screen grid and a grid leak resistor connecting said first grid to ground.

References Cited in the file of this patent

UNITED STATES PATENTS

| | | |
|---|---|---|
| 2,806,949 | Smith | Sept. 17, 1957 |
| 2,831,971 | Wischmeyer | Apr. 22, 1958 |
| 2,863,139 | Michelson | Dec. 2, 1958 |
| 2,901,532 | Sullivan | Aug. 25, 1959 |